US008953434B1

(12) United States Patent
Tirupachur Comerica et al.

(10) Patent No.: US 8,953,434 B1
(45) Date of Patent: Feb. 10, 2015

(54) PROVIDING HIGH AVAILABILITY AS A SERVICE WITH NETWORK DEVICES

(71) Applicant: Juniper Networks, Inc., Sunnyvale, CA (US)

(72) Inventors: Subash Tirupachur Comerica, Sunnyvale, CA (US); Dhiraj D. Ballal, Santa Clara, CA (US); Prasad Chiqurupati, Cupertino, CA (US); Rohini Kasturi, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 131 days.

(21) Appl. No.: 13/853,988

(22) Filed: Mar. 29, 2013

(51) Int. Cl.
*H04L 1/00* (2006.01)
*H04L 12/24* (2006.01)
*G06F 15/173* (2006.01)

(52) U.S. Cl.
CPC .................................. *H04L 41/0668* (2013.01)
USPC .......................................... 370/216; 709/223

(58) Field of Classification Search
None
See application file for complete search history.

(56) References Cited

U.S. PATENT DOCUMENTS

| | | | |
|---|---|---|---|
| 7,184,437 B1 | 2/2007 | Cole et al. | |
| 8,339,959 B1 | 12/2012 | Moisand et al. | |
| 8,693,398 B1 * | 4/2014 | Chaganti et al. | 370/328 |
| 2003/0149746 A1 * | 8/2003 | Baldwin et al. | 709/219 |
| 2004/0116070 A1 * | 6/2004 | Fishman et al. | 455/3.02 |
| 2007/0021132 A1 * | 1/2007 | Jin et al. | 455/518 |
| 2008/0044181 A1 | 2/2008 | Sindhu | |
| 2008/0163291 A1 * | 7/2008 | Fishman et al. | 725/34 |
| 2009/0201799 A1 * | 8/2009 | Lundstr m et al. | 370/217 |
| 2010/0299319 A1 * | 11/2010 | Parson et al. | 707/713 |
| 2013/0003736 A1 | 1/2013 | Szyszko et al. | |
| 2013/0007237 A1 | 1/2013 | Mehta et al. | |
| 2013/0185767 A1 * | 7/2013 | Tirupachur Comerica et al. | 726/4 |

OTHER PUBLICATIONS

"High-availability Network Architectures for Triple-Play Services" Technical White Paper, Nokia Siemens Networks, 2008, 24 pgs.
"3GPP TS 23.401—General Packet Radio Service (GPRS) enhancements for Evolved Universal Terrestrial Radio Access Network, " version 10.0.0, 3rd Generation Partnership Project, Technical Specification Group Services and System Aspects, Jun. 2010, 261 pp.

(Continued)

*Primary Examiner* — Clemence Han
(74) *Attorney, Agent, or Firm* — Shumaker & Sieffert, P.A.

(57) ABSTRACT

In general, techniques are described for providing high availability as a service. The techniques may be performed by a device that includes an interface and a control unit. The interface is configured to receive network traffic originating from a subscriber device operated by a subscriber. The control unit is configured to determine whether to provide a high availability service with respect to at least a portion of the network traffic based on a subscriber profile associated with the subscriber. The control unit may further be configured to provide the high availability service for at least the portion of the network traffic based on the determination of whether to provide the high availability service. The control unit may further be configured to process at least the portion of the network traffic with the network device, and forward at least the portion of the network traffic.

29 Claims, 4 Drawing Sheets

(56) References Cited

OTHER PUBLICATIONS

"3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, 183 pp.

U.S. Appl. No. 12/905,771, filed Oct. 15, 2010 entitled Collectively Addressing Wireless Devices.

* cited by examiner

PROVIDING HIGH AVAILABILITY AS A SERVICE WITH NETWORK DEVICES

TECHNICAL FIELD

The techniques of this disclosure relate to computer networks and, more specifically, to providing high availability within computer networks.

BACKGROUND

The goal of high availability computer network environments is to provide users and other entities with "always on" service. That is, high availability computer network environments should provide reliable, continuous operation service. To accomplish this, network devices in a high availability environment perform error detection and implement recoverability for detected errors. Unfortunately, network devices occasionally fail.

When a network device fails, all network traffic flowing through the failed network device may cease. For an enterprise that depends on such network traffic, this may be unacceptable, even if this failure occurs only for a short time. To minimize the possibility of a failure causing all network traffic to cease, redundant hardware such as a backup controller or a separate backup network device may be installed. When the primary controller fails, this primary controller (which may also be referred to as a "master controller") may switch over (or, in other words, fail-over) to the backup controller. Likewise, when the primary network device fails, this primary network device (which may also be referred to as a "master network device") may switch over (or, in other words, fail-over) to the backup network device. After failing over or switching over to the backup device, the backup device becomes the master device. High availability clusters often include such primary and backup network devices.

Typically, a server provider may deploy a backup network device adjacent to a customer or subscriber premises to ensure high availability for those customers or subscribers that access the service provider via the master network device. The service provider may then ensure fail-over of all sessions routed through the master network device to the backup network device so as to provide high availability for those customers or subscribers that access the service provider network via the master network device.

SUMMARY

In general, techniques are described for providing high availability as a service. A network device may perform the techniques to provide high availability on a per-subscriber basis, synchronizing data used to process network traffic originated by subscriber devices based on subscriber profiles. The network device may determine whether to provide the high availability services based on the corresponding one of subscriber profiles. The network device may, in this respect, perform the high availability service on a per-subscriber basis rather than provide high availability with respect to all network traffic regardless of the subscriber that originated the traffic. In this way, the techniques described in this disclosure may facilitate provisioning of high availability when there is a mix of subscribers that desire high availability with those who do not desire high availability as a service. The techniques may, as noted above, accommodate mobile environments where this mix of subscribers is likely to occur. Moreover, the techniques may allow the operator/service provider to do proper capacity planning (in terms of provisioning high availability) given that high availability may be offered as a service to support those of the subscribers that desire high availability.

In one embodiment, a method comprises receiving, with a network device, network traffic originating from a subscriber device, determining, with the network device, whether to provide a high availability service with respect to at least a portion of the network traffic based on a subscriber profile associated with a subscriber that operates the subscriber device, and providing, with the network device, the high availability service for at least the portion of the network traffic based on the determination. The method further comprises processing, with the network device, at least the portion of the network traffic with the network device, and forward, with the network device, at least the portion of the network traffic In another embodiment a network device comprises at least one interface configured to receive network traffic originating from a subscriber device operated by a subscriber, and a control unit configured to determine whether to provide a high availability service with respect to at least a portion of the network traffic based on a subscriber profile associated with the subscriber and provide the high availability service for at least the portion of the network traffic based on the determination of whether to provide the high availability service. process at least the portion of the network traffic with the network device, and forward at least the portion of the network traffic In another embodiment, a non-transitory computer-readable storage medium has stored thereon instructions that, when executed, cause one or more processors of a network device to receive network traffic originating from a subscriber device operated by a subscriber, determine whether to provide a high availability service with respect to at least a portion of the network traffic based on a subscriber profile associated with the subscriber, provide the high availability service for at least the portion of the network traffic based on the determination of whether to provide the high availability service, process at least the portion of the network traffic with the network device, and forward at least the portion of the network traffic.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
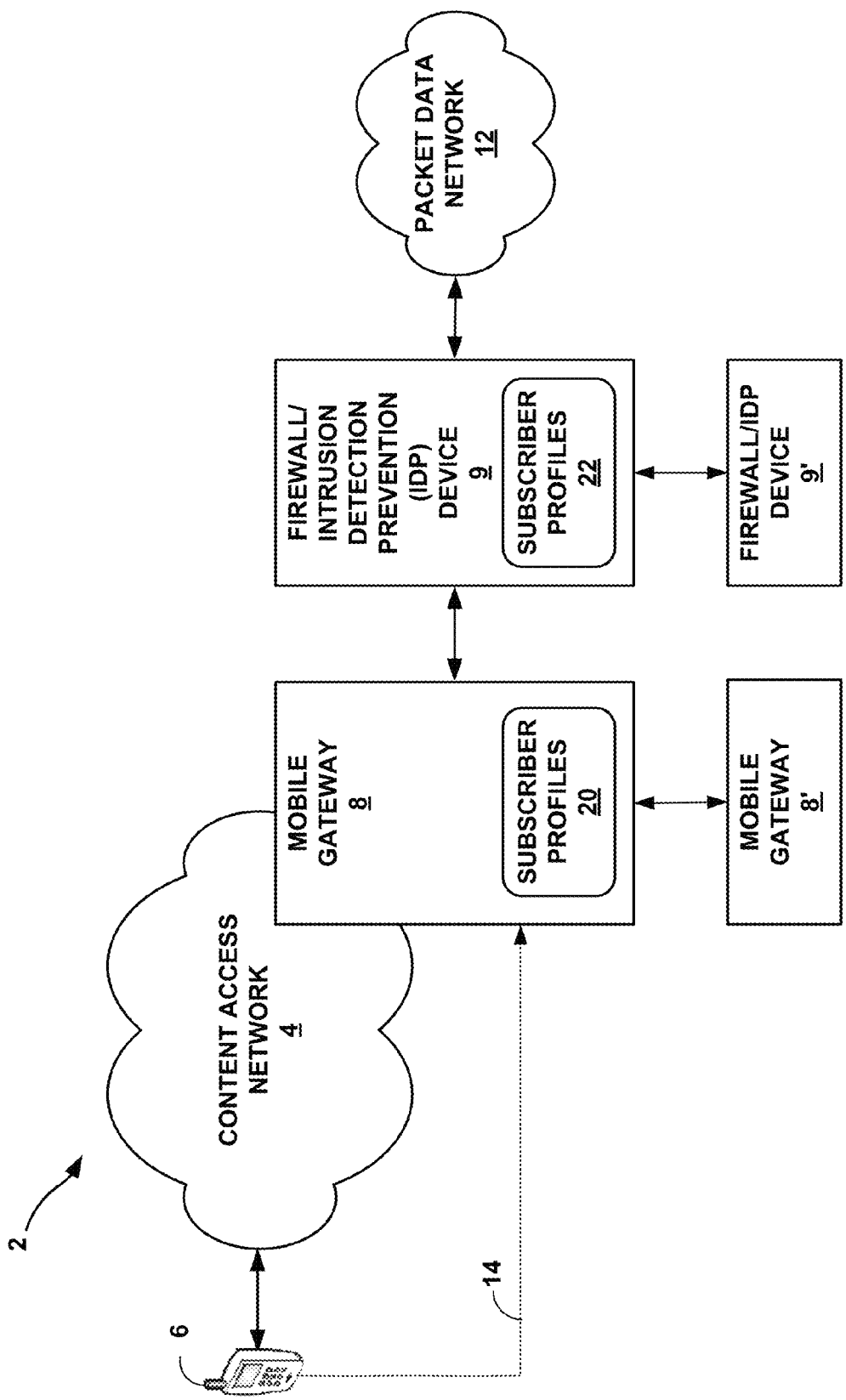
FIG. 1 is a block diagram illustrating an example network system in which various network devices provide high availability in accordance with one or more aspects of the techniques described in this disclosure.

FIG. 1 is a block diagram illustrating an example network system 2 in which various network devices 8 and 9 provide high availability in accordance with one or more aspects of the techniques described in this disclosure. In this example, network system 2 comprises packet data network (PDN) 12 coupled to content access network 4 ("CAN 4") via mobile gateway 8 of CAN 4. Packet data network 12 supports one or more packet-based services that are available for request and use by wireless device 6. PDN 12 may provide, for example, bulk data delivery, voice over Internet protocol (VoIP), Internet Protocol television (IPTV), Short Messaging Service (SMS), Wireless Application Protocol (WAP) service, or customer-specific application services. Packet data network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates CAN 4, an enterprise IP network, or some combination thereof. In some instances, PDN 12 is connected to a public WAN, the Internet, or to other networks. PDN 12 executes one or more packet data protocols (PDPs), such as IP (IPv4 and/or IPv6), X.25 or Point-to-Point Protocol (PPP), or any other type of protocol that enables packet-based transport of services provided by PDN 12.

Wireless device 6 may represent a mobile telephone, a laptop or desktop computer having, e.g., a 3G/4G wireless card, a wireless-capable netbook, a video game device, a pager, a smart phone, a personal data assistant (PDA), a utility meter, or a security device such as a motion detector or door lock or any other type of mobile communication device. Wireless device 6 may run one or more applications, such as VoIP clients, video games, videoconferencing, E-mail, and Internet browsers, among others. Certain applications running on wireless device 6 may require access to services offered by PDN 12. Wireless device 6 may also be referred to, in various architectural embodiments, as user equipment (UE) or mobile stations (MS).

Typically, a so-called "service provider" operates CAN 4 to provide network access, data transport and other services to wireless device 6. In general, CAN 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GGP/2), an Internet Engineering Task Force (IETF) and a Worldwide Interoperability for Microwave Access (WiMAX) forum. For example, CAN 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Content access network 4 may, alternatively or in conjunction with one of the above, implement a Code Division Multiple Access-2000 ("CDMA2000") or Enhanced Data Rates for GSM Evolution (EDGE) architecture. Content access network 4 may, again as an alternative or in conjunction with one or more of the above, implement a WiMAX architecture defined by the WiMAX forum.

In some examples, content access network 4 may comprise a core packet-switched network (not shown in FIG. 1) and one or more radio access networks (also not shown in FIG. 1). A core packet-switched network of CAN 4 may comprise, for example, a general packet radio service (GPRS) core packed-switched network, an IP-based mobile multimedia core network, or an Evolved Packet Core (EPC) or Evolved Packet System (EPS). The core packet-switched network of CAN 4 comprises intermediate devices required to implement the protocols of the particular architectural embodiment of CAN 4, such as Serving GPRS Serving Nodes (SGSNs) and Mobility Management Entities (MMEs). Wireless device 6 communicates with CAN 4 using a wireless communication link to one of the radio access networks of the content access network. Radio access networks of CAN 4 may include, for example, for example, a GSM Radio Access Network (GRAN), a WiMAX radio access network, a UMTS Radio Access Network (UTRAN), and/or an evolution of a UTRAN known as an E-UTRAN. Content access network 4 may further include a backhaul or transport network (not shown) that includes land-based transmission lines, frequently leased by a service provider for the content access network, to transport user and control traffic between wireless device 6 and mobile gateway 8. The backhaul network also includes network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the example of FIG. 1, mobile gateway 8 is a network device that operates as a gateway to PDN 12 and may comprise, for example, a Gateway GPRS Serving Node (GGSN), an Access Gateway (aGW), or a Packet Gateway (P-GW). Mobile gateway 8 may present a uniform interface to downstream nodes, such as SGSNs and MMEs, to allow the downstream nodes to send session requests to the uniform interface rather than separately directing session requests among multiple devices or multiple control plane entities (e.g., service cards) within a single device. In some instances, the uniform interface is an IP address or other network layer address of mobile gateway 8 that is shared among all control plane entities.

In some implementations, mobile gateway 8 may be a router that executes routing protocols to identify routes through CAN 4 or PDN 12 to various destinations. While described herein with respect to one or more particular architectures for ease of illustration purposes, CAN 4 may implement any architecture including those set forth by any standards body and those proprietarily owned. Moreover, the techniques may apply to any mobile data protocol supported by these architectures. The techniques therefore should not be limited to cellular architectures referenced to herein and the mobile data protocols supported by these architectures. Mobile gateway 8 and other elements of content access network 4 may, therefore, each represent an abstraction of devices found within any type of mobile network architectures. In this sense, the network device may comprise a mobile gateway that facilitates access by a mobile device to a mobile network.

Content access network 4 establishes and operates bearers to transport user traffic, in the form of PDP packet data units (PDUs), referred to hereinafter as "packets." In general, a bearer is a set of network resources and data transport functions in CAN 4 to deliver user traffic between two network entities. A bearer may include a path, a logical connection, or a physical or wireless connection between two network devices. A bearer may comprise, for example, an Evolved Packet System (EPS) bearer. Further details regarding bearer setup and management are found in "3GPP TS 23.401— General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

To attach to CAN 4, wireless device 6 initiates an attach request by issuing session request 14 toward CAN 4. Session request 14 includes a mobile device identity that identifies wireless device 6 to mobile gateway 8. The wireless device identity may represent, for example, an International Mobile Subscriber Identity (IMSI), a Temporary Mobile Subscriber Identity (TMSI), a P-TMSI, a System Architecture Evolution (SAE) TMSI or S-TMSI, an International Mobile Equipment Identity (IMEI), a subscriber username, an MSISDN number (e.g., a "Mobile Subscriber Integrated Services Digital Network Number") or other data identifying wireless device 6. In this way, mobile gateway 8 received a wireless device identity for wireless device 6 in session request 14. The wireless device identity may also identify the subscriber operating wireless device 6 and may represent a form of subscriber identifier in this sense.

While illustrated as a single message from wireless device 6 to mobile gateway 8, session request 14 may represent a plurality of messages that traverse intermediate network devices of CAN 4 to identify wireless device 6 to mobile gateway 8. For example, in an LTE architecture, session request 14 may represent an initial Attach Request message issued by wireless device 6 to an eNode B, which forwards the request to an MME. The MME may incorporate information received in the Attach Request message, including the wireless device identity, into a first Create Session Request message that the MME then sends to an SGSN and that is also represented by session request 14. The SGSN generates a second Create Session Request message that incorporates information received by the SGSN in the first Create Session Request, such as the wireless device identity. The second Create Session Request message, which is sent by the SGSN to a GGSN represented by mobile gateway 8, is also represented by session request 14. As another example, session request 14 may represent an Activate PDP Context Request message from wireless device 6 to an SGSN and a Create PDP Context Request message from the SGSN to mobile gateway 8. Other mobile network architectures may have similar messaging schemes to identify wireless device 6 to mobile gateway 8 as part of an attach procedure or other procedure to establish a requested session. In addition, the initial Attach Request or Active PDP Context Request message may be responsive to a request by mobile gateway 8 to wireless device 6 to initiate a session with mobile gateway 8.

Content access network 4 delivers session request 14 to mobile gateway 8, which may include one or more subscriber management service units (not shown in the example of FIG. 1 for ease of illustration purposes) that establish a CAN session. More information regarding how these subscriber management service units may establish this CAN session may be found in U.S. patent application Ser. No. 13/172,556, entitled "MOBILE GATEWAY HAVING DECENTRALIZED CONTROL PLANE FOR ANCHORING SUBSCRIBER SESSIONS," and filed Jun. 29, 2011, the entire contents of which are hereby incorporated by references as if set forth in its entirety. In general, the CAN session is an association between CAN 4 and wireless device 6 that is identifiable by a combination of a wireless device 6 PDP address and an Access Point Name (APN) for a service provided by PDN 12. That is, the CAN session (hereinafter, "subscriber session" or "session") is a service-specific (as specified by the APN) session for a service provided to wireless device 6. Besides establishing a default bearer, the attach procedure may trigger establishment, by CAN 4, of one or more dedicated bearers between mobile gateway 8 and wireless device 6 to carry user traffic. In an IP-based content access network 4, a session comprises an IP-CAN session.

As further shown in the example of FIG. 1, network system 2 may include a network security device 9 positioned intermediately between CAN 4 and PDN 12. Network security device 9 may represent a network device that provides one or more security services, which may include a firewall, an anti-virus, and an Intrusion Detection/Prevention (IDP) service. Network security device 9 may represent one or more of a firewall device, an IDP device, an Integrated Security Gateway (ISG) device, or any other device capable of providing one or more security services. Network security device 9 may be positioned intermediately between CAN 4 and PDN 12 to ensure that malicious packets attempting to infect or otherwise harm CAN 4 cannot enter CAN 4 from PDN 12. Network security device 9 may also prevent unauthorized access of CAN 4 by mobile devices similar to mobile device 6 that are not authorized to access CAN 4. In some instances, network security device 9 may receive authorization to permit wireless devices, such as wireless device 6, to access PDN 12 from CAN 4. Network security device 9 may, in some instances, attempt to prevent malicious packets or other harmful traffic from leaving CAN 4 to infect endpoint devices coupled to PDN 12.

As further shown in the example of FIG. 1, network system 2 includes redundant devices 8' and 9', which may be deployed to provide so-called "high availability." The phrase "high availability" refers to deployments of redundant hardware that provide backup or standby functionality to be used should the primary devices, such as devices 8 and 9 fail. In the context of so-called "hot standby," primary devices 8 and 9 may synchronize all session- or flow-state data of all sessions or flows processed by primary devices 8 and 9 to standby devices 8' and 9'. Upon failure of one or more of primary devices 8 and 9, the corresponding one or more of standby devices 8' and 9' may resume processing of the sessions and/or flows using the synchronized session- and/or flow-state data, often in a manner that is seamless to the endpoints (meaning within periods of time that do not disrupt normal protocol operation). In the context of so-called "warm standby," primary devices 8 and 9 may not synchronize data, but may simply alert backup devices 8' and/or 9' of their respective failure so that backup devices 8' and/or 9' may begin processing traffic originating from wireless devices of CAN 4, such as wireless device 6. In this warm standby context, backup devices 8' and/or 9' may require wireless devices of CAN 4 to reinitiate sessions and/or flows due to the lack of state data synchronization. The techniques of this disclosure are described within the context of hot standby, but may in various instances be performed with respect to warm standby contexts.

High availability of this nature is commonly deployed on an all or none basis. In other words, service providers that operate CAN 4 may not presently have a way by which to mix a bunch of subscribers who may desire the high reliability offered by high availability with those who have no or little desire for such high reliability (and which may accept the slight disruption caused by having to reinitiate a lost connection). The service provider may then only deploy high availability for those large customers capable of paying sufficient fees to support the extra deployment of hardware required to provide high availability.

Moreover, typically, high availability is tied to a form of connection having certain service level agreements (SLA) that guarantee a certain amount of availability. That is, the service providers are not able to offer high availability as a service separate from the form of connection but as a mandatory requirement of particular forms of connections (such as a T1 connection). In this sense, the service provider is required to provide high availability for flows and/or sessions for which high availability is not beneficial to ensure the availability of the SLA, when the customer or subscriber has little concern for ensuring that such flows and/or sessions receive adequate high availability. To illustrate, most customers do not require high availability for short web-browsing sessions, but may require high availability for voice over Internet protocol (VoIP) calls and/or video conferencing calls. Presently, service providers may only provide high availability on an all or none basis, which may require provisioning sufficient hardware resources to accommodate each and every flow and/or session originated from the customer rather than just those that the customer actually requires for performing business-related transactions (as one example). Having to provision high availability in this all or nothing way may be costly, especially considering that high availability may not be offered as a service to any customer that connects to CAN 4 given that high availability is tied to a form of connection often not purchased by smaller entities and individuals.

In accordance with the techniques described in this disclosure, mobile gateway 8 may provide high availability on a per-subscriber basis, synchronizing data used to process network traffic originated by subscriber devices, such as wireless device 6, based on subscriber profiles 20. Mobile gateway 8 may represent one type of network device that provides high availability as a service available on a subscriber-to-subscriber basis in accordance with the techniques described in this disclosure. Mobile gateway 8 may access subscriber profiles 20 based on identifiers specified by the subscriber devices in network traffic originated by these subscriber devices. Mobile gateway 8 may determine which of subscriber profiles 20 correspond to which subscriber devices based on the identifier specified in the network traffic. Mobile gateway 8 may then determine whether to provide the high availability services based on the corresponding one of subscriber profiles 20. Mobile gateway 8 may, in this respect, perform the high availability service on a per-subscriber basis rather than provide high availability with respect to all network traffic regardless of the subscriber that originated the traffic.

In operation, mobile gateway 8 may receive network traffic originating from a subscriber device, such mobile device 6, operated by a subscriber (not shown in the example of FIG. 1). Mobile gateway 8 may then determine whether to provide a high availability service with respect to at least a portion of the network traffic based on the one of subscriber profiles 20 associated with the subscriber. That is, mobile gateway 8 may determine a subscriber identifier from the network traffic that identifies the subscriber. Mobile gateway 8 may then access subscriber profiles 20 based on the subscriber identifier to retrieve the one of subscriber profiles 20 associated with the subscriber. In other words, subscriber profiles 20 may be indexed by any form of subscriber identifier, including an Internet protocol (IP) address or address prefix assigned to the subscriber for use in accessing CAN 4 and/or a media access control (MAC) address assigned to the subscriber for use in accessing CAN 4 to name a few examples. The subscriber identifier may represent any form of data that uniquely identifies or is uniquely associated with the subscriber (at least within the context of CAN 4). In some instances, rather than store subscriber profiles 20 locally, mobile gateway 8 may access a remote authentication dial-in user service (RADIUS) server or some other form of authentication server to retrieve the one of subscriber profiles 20 that corresponds to the subscriber operating wireless device 6. In any event, mobile gateway 8 may determine, based on the subscriber profile, whether to provide the high availability service.

Mobile gateway 8 may then provide the high availability service for at least the portion of the network traffic based on the determination of whether to provide the high availability service. Mobile gateway 8 may provide the high availability service for at least the portion of the network traffic by synchronizing data required to process at least the portion of the network traffic to mobile gateway 8' so that mobile gateway 8' is available to process at least the portion of the network traffic when mobile gateway 8 fails. That is, mobile gateway 8' may receive information or data required to carry on processing network traffic originated by wireless device 6. Upon failure of mobile gateway 8, mobile gateway 8' may detect this failure and resume processing of network traffic originated by wireless device 6 or destined for wireless device 6. In other words, providing the high availability service for at least the portion of the network traffic comprises synchronizing, with a primary control unit of the network device, data required to perform the processing of at least the portion of the network traffic to a backup control unit so that the backup control unit is available to process at least the portion of the network traffic upon failover of the primary control to the backup control unit.

Although described below in more detail, mobile gateway 8 may synchronize subscriber information used to process network traffic (such as authentication and/or authorization information indicated that various sessions or flows originated by wireless device 6 are valid) to mobile gateway 8'. In some instances, mobile gateway 8 may only synchronize data for certain sessions or flows corresponding to certain services that are often identified by or associated with an access point name (which may be specified in the subscriber profile). Mobile gateway 8 may also perform this high availability service according to a time of day schedule, in which the high availability service is applied during certain periods of the day (e.g., during peak business hours). In some instances, mobile gateway 8 may only synchronize data and thereby provide the high availability service for a set or configurable duration of time (e.g., during the first five minutes of any session or flow). In some instances, mobile device 8 may monitor the subscriber device, such as wireless device 6, to determine parameters associated with wireless device 6, such as a type, length, and time of day of flows and/or sessions, where mobile device 8 may perform a heuristic analysis of these parameters to determine when to synchronize data and whether to synchronize data for all sessions and/or flows associated with the subscriber device or only some sessions and/or flows associated with the subscriber device.

Firewall/IDP device 9 may also perform the techniques described in this disclosure to provide a high availability service on a per-subscriber basis. Firewall/IDP device 9 may retrieve or otherwise store subscriber profiles 22, which may specify whether or not the high availability service is to be applied to network traffic originated by a subscriber device operated by the subscriber. Firewall/IDP device 9 may, similar to mobile gateway 8, may receive network traffic originating from a subscriber device, such mobile device 6, operated by a subscriber. Firewall/IDP device 9 may then determine whether to provide a high availability service with respect to at least a portion of the network traffic based on the one of subscriber profiles 22 associated with the subscriber. Firewall/IDP device 9 may then provide the high availability service for at least the portion of the network traffic based on the determination. Firewall/IDP device 9 may provide the high availability service for at least the portion of the network traffic by synchronizing data required to process at least the portion of the network traffic to firewall/IDP device 9' so that firewall/IDP device 9' is available to process at least the portion of the network traffic when firewall/IDP device 9 fails. That is, firewall/IDP device 9' may receive information or data required to carry on processing network traffic originated by wireless device 6. Upon failure of firewall/IDP device 9, firewall/IDP device 9' may detect this failure and resume processing of network traffic originated by wireless device 6 or destined for wireless device 6.

In this way, the techniques described in this disclosure may facilitate provisioning of high availability when there is a mix of subscribers that desire high availability with those who do not desire high availability as a service. The techniques may, as noted above, accommodate mobile environments where this mix of subscribers is likely to be found. Moreover, the techniques may allow the operator/service provider to do proper capacity planning (in terms of provisioning high availability) given that high availability may be offered as a service to support those of the subscribers that desire high availability. In other words, the operator need not provision backup control units of the same or similar processing capabilities given that only a percentage of the total subscribers may desire high availability. The backup control unit may then only need to be able to handle the percentage of the total subscribers that desire high availability without having to handle each of the subscribers. In this sense, the techniques may promote cost savings for the provider in that backup control units need not necessarily be of the same capacity as the primary control unit.

The provider may then separate high availability from the underlying data or other service, enabling high availability to be offered as an additional or add-on service. Those subscribers that do not desire high availability may therefore receive a discounted price (in comparison to data or other services offered by conventional providers that bundle high availability as part of a service of a certain tier or level, which may alone be desirable for other reasons separate from high availability, such as bandwidth or network speed). Accordingly, the techniques may enable providers to better compete in the increasingly competitive mobile and/or broadband Internet service market.

One example of such subscribers that may not desire high availability are machine-to-machine sessions ("M2M sessions"). Such M2M sessions may involve a device, such as an electric meter that is capable of wireless communication with CAN 4, that reports data or other information to another machine or device, such as an accounting server in the example of a wirelessly capable electric meter. Often, it is not of significant importance as to when a given meter reading is reported to the accounting server of the electric company. As such, the electric company may not be interested in high availability for such M2M sessions, but would want other business sessions to benefit from high availability. The service provider may then implement or otherwise perform the techniques described in this disclosure to enable high availability to offered as an add-on service to the business-related sessions, but removed from those M2M sessions, thereby potentially lowering network service costs associated with the M2M sessions.

While shown as separate devices 8' and 9', high availability may be provided using duplicate hardware within the same device. In some instances, high availability may be achieved using duplicate hardware within the same server rack, where a backplane or other communication medium interconnects the duplicate hardware with the primary hardware. Thus, while shown as involving duplicate devices, the techniques may be employed with respect to any form of redundant hardware environment whether in the form of redundant devices or in the form of redundant hardware (e.g., a primary controller or control unit and a backup controller or control unit) in the same device. Moreover, as described in this disclosure in more detail, the techniques may not require duplicate hardware but merely hardware that is capable of performing the same types of services or processes. That is, the techniques may, as noted in this disclosure, provide for a way by which the redundant hardware or device does not have to provide exactly the same processing capacity such that a duplicate or exact duplicate device or hardware is required to provide high availability.

Moreover, while shown as separate from one another, mobile gateway 8 and firewall/IDP device 9 may form or reside within a single device. In other words, the techniques may be implemented or otherwise performed by a network device that includes both of mobile gateway 8 and firewall/IDP device 9. Moreover, a single network device may include not only mobile gateway 8 and firewall/IDP device 9, but also the backup or so-called standby mobile gateway 8' and firewall/IDP device 9'. Accordingly, the techniques as described with respect to one of mobile gateway 8 or firewall/IDP device 9 are merely an exemplary recitation of what either of these devices 8 and 9 may perform. The techniques should therefore not be limited to any particular one of devices 8 and 9, but may be performed in whole by either one of devices 8 and 9 or a combination of devices 8 and 9.

Figure 2:
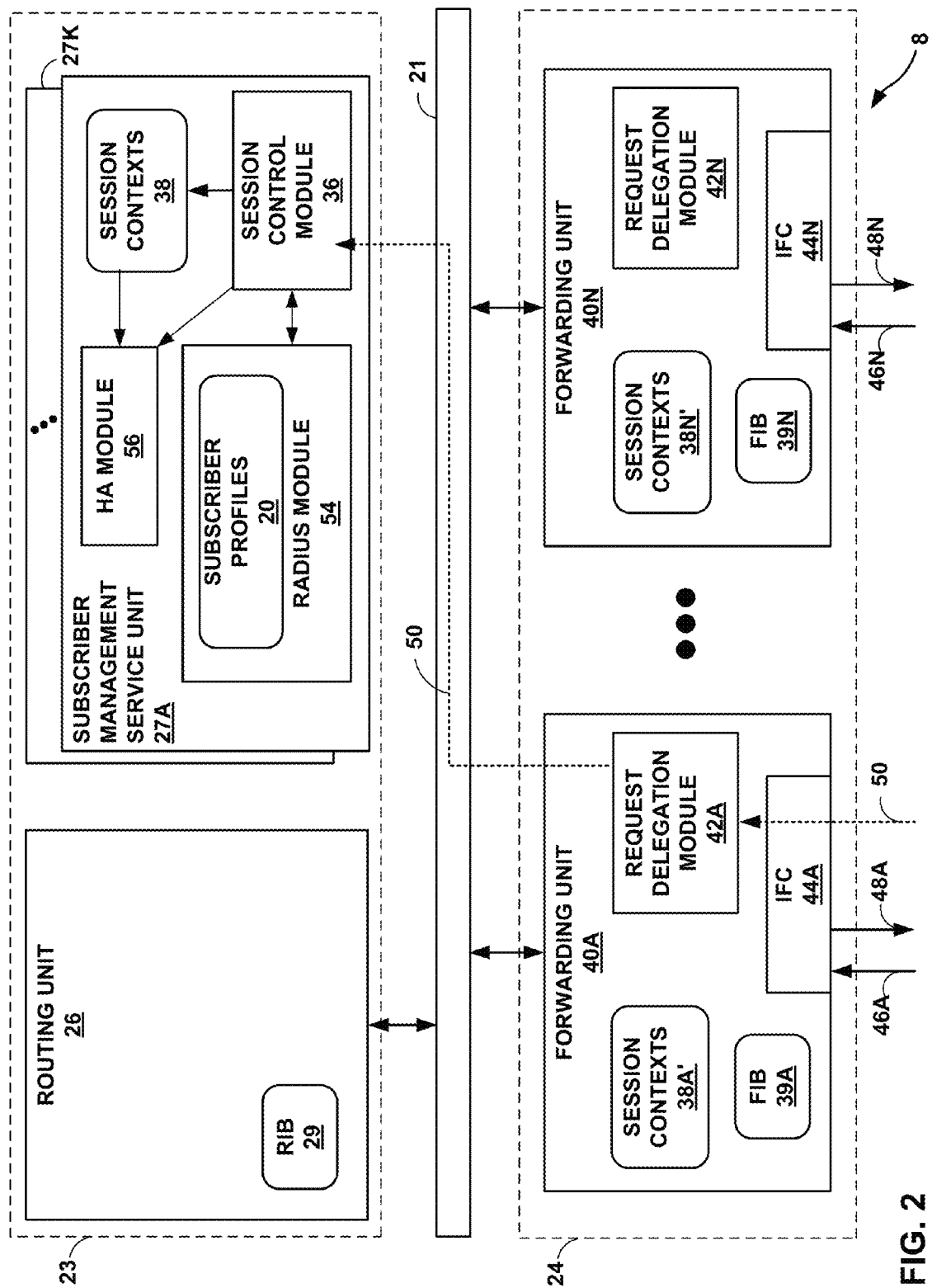
FIG. 2 is a block diagram illustrating, in further detail, the mobile gateway of FIG. 1 that performs the high availability techniques described in this disclosure.

FIG. 2 is a block diagram illustrating, in further detail, an example embodiment of mobile gateway 8 of FIG. 1 that performs the high availability techniques described in this disclosure. In this example, mobile gateway 8 is divided into two logical or physical "planes" to include a first control plane 23 and a second "data" or "forwarding" plane 24. That is, mobile gateway 8 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 23 is a decentralized control plane in that control plane functionality is distributed among routing unit 26 and a plurality of subscriber management service units 27A-27K ("subscriber management service units 27"). Similarly, data plane 24 in this example is a decentralized data plane in that data plane functionality and packet forwarding functionality is distributed among a plurality of forwarding units 40A-40N ("forwarding units 40"). Each of routing unit 26, subscriber management service units 27, and forwarding units 40 may comprise one or more control units (not shown in FIG. 2). Each of the control units may represent, in one example, one or more processors that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of the control units may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 21 couples routing unit 26, subscriber management service units 27, and forwarding units 40 to deliver data units and control messages among the units. Switch 21 may represent an internal switch fabric or cross-bar, bus, or link. Examples of high-speed multi-stage switch fabrics used as a forwarding plane to relay packets between units within a router are described in U.S. Patent Application 2008/0044181 and entitled "MULTI-CHASSIS ROUTER WITH MULTIPLEXED OPTICAL INTERCONNECTS," the entire contents of which are hereby incorporated by reference.

Routing unit 26 executes the routing functionality of mobile gateway 8. In this respect, routing unit 26 represents hardware or a combination of hardware and software that implements routing protocols (not shown in FIG. 2) by which routing information stored in a routing information base 29 ("RIB 29") may be determined. RIB 29 may include information defining a topology of a network, such as CAN 4 of FIG. 1. Routing unit 26 may resolve the topology defined by routing information in RIB 29 to select or determine one or more routes through the network. Routing unit 26 may then update data plane 24 with these routes, where forwarding units 40 of data plane 24 store these routes as respective forwarding information bases 39A-39N ("FIBs 39"). Further details of one example embodiment of a router can be found in U.S. patent application Ser. No. 12/182,619, filed July 30, entitled "STREAMLINED PACKET FORWARDING USING DYNAMIC FILTERS FOR ROUTING AND SECURITY IN A SHARED FORWARDING PLANE," which is incorporated herein by reference.

Data plane (alternatively, "forwarding plane") 24 represents hardware or a combination of hardware and software that forward network traffic in accordance with forwarding information. In the example of mobile gateway 8 of FIG. 2, data plane 24 includes forwarding units 40 that provide high-speed forwarding of network traffic received by interface cards 44A-44N ("IFCs 44") via inbound links 46A-46N to outbound links 48A-48N. Forwarding units 40 may each comprise one or more packet forwarding engine ("PFE") coupled to respective interface cards 44 and may represent, for example, a dense port concentrator (DPC), modular port concentrator (MPC), flexible physical interface card (PIC) concentrator (FPC), or another line card, for example, that is insertable within a mobile gateway 8 chassis or combination of chassis.

In the example of FIG. 2, IFC card 44A receives session request 50 on inbound interface 46A and forwards the session request to request delegation module 42A. Upon receiving session request 50, request delegation module 42A selects associated service unit 27A to handle the session request and forwards session request 50 to service unit 27A. Request delegation module 42A may process the session request to remove GTP and other headers. Session request 50 may represent an example of session request 14 of FIG. 1 and may include, for instance, a Create Session Request message transmitted by a Serving Gateway (S-GW) to mobile gateway 8 operating as a PGW of an EPC of an LTE network or a Create PDP Context Request transmitted by an SGSN to mobile gateway 8 operating as a GGSN of a GPRS packet-switched network. Session request 50 includes a wireless device identifier (e.g., an IMSI) and may further include an Access Point Name that identifies a packet data network and may in some instances further identify a requested service (e.g., Internet, WAP, or multimedia messaging service (MMS)) provided by the packet data network. In other words, the APN is a logical name that determines the appropriate gateway (e.g., GGSN) for the wireless device and by a gateway to determine the services requested by the user or the address of an access point in an external packet network to which user packets from the wireless device should be forwarded.

Subscriber management service units 27 of control plane 20 present a uniform interface to subscriber devices and provide decentralized service session setup and management for mobile gateway 8. For example, all of subscriber management service units 27 may be addressable by the same IP or other PDP address, and control messages destined for the same IP or other PDP address of subscriber management service units 27 may therefore be handled by any of the service units. Internally, each of subscriber management service units 27 may include a unique identifier that identifies the service unit to other components of mobile gateway 8. Subscriber management service units 27 identifiers may include, for example, an index, identifying string, internal IP address, or link layer address. Subscriber management service units 27 may each represent, for example, a packet forwarding engine (PFE) or a component of physical interface card insertable within a chassis of mobile gateway 8. The physical interface card may be, for instance, a multi-services dense port concentrator (MS-DPC). Subscriber management service units 27 may also each represent a co-processor executing on a routing node, such as routing unit 26. Subscriber management service units 27 may be alternatively referred to as "service PICs" or "service cards." Each of subscriber management service units 27 includes substantially similar components to perform substantially similar functionality, said components and functionality being described hereinafter with respect to service unit 27A.

Session control module 36 of service unit 27A establishes sessions requested by a content access network in which mobile gateway 8 is located and manages the sessions once established. Session control module 36 stores session data, received in control plane protocol messages received by session control module 36 or allocated by session control module 36, for one or more sessions managed by service unit 27A in session contexts 38. Service unit 27A may be referred to as the anchoring service unit for sessions stored in session contexts 38 in that service unit 27A stores control and forwarding information needed to manage the sessions. Each of subscriber management service units 27 includes an instance of session control module 36 and may therefore independently execute control plane protocols required to establish a session for a subscriber. In this sense, the subscriber management service units 27 provide a form of a decentralized control plane for managing subscriber communication sessions. As a result, mobile gateway 8 may achieve increased scalability to handle thousands or millions of concurrent communication sessions from mobile devices. A session context stored in session contexts 38 for a session in which a wireless device participates may include, for example, the PDP address allocated by the CAN for the wireless device for use in sending and receiving user packets, routing information used by service unit 27A in forwarding user packets such as tunnel endpoint identifiers (TEIDs) and identifiers/addresses for downstream nodes, the APN for the session, and quality of service (QoS) profiles.

As control plane anchors for subscriber sessions, service units 27 handle configuration of forwarding units 40 for constructing subscriber-specific forwarding paths for processing and forwarding data traffic from the mobile devices. For example, service unit 27A may program session contexts 38 to forwarding units 40 for storage in respective session contexts 38A'-38N' ("session contexts 38'"). Forwarding unit 40A, for instance, receives user packets, maps the user packets to a session context in session contexts 38', and apply forwarding constructs to forward the user packets according to the session context data. For example, forwarding of downstream user packets by forwarding unit 40A for a particular session may include encapsulating the user packets using the GPRS Tunneling Protocol (GTP) and setting the specified downstream TEID for the session within a GTP header. Example details on subscriber management units constructing subscriber-specific forwarding paths within forwarding units 40 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

In establishing the various sessions, session control module 36 may interface with RADIUS module 54 to retrieve one of subscriber profiles 20 associated with the subscriber requesting the session. RADIUS module 54 may represent any type of module by which subscriber profiles 20 may be accessed or retrieved. In any event, session control module 36 may use the wireless device identifier extracted from the session message 50 as a subscriber identifier, presenting a request to RADIUS module 54 that includes this wireless device identifier and that requests that the one of subscriber profiles 20 associated with the wireless device identifier be returned to session control module 36. RADIUS module 54 may retrieve the one of subscriber profiles 20 that is associated with the wireless device identifier, either from a local data store (in the sense, RADIUS module 54 may represent a local RADIUS server) or from a RADIUS server external to mobile gateway 8. RADIUS server 54 may then provide the corresponding one of subscriber profiles 20 to session control module 36.

Session control module 36 may then determine whether to provide high availability as a service for the one of session contexts 38 established in response to message 50 based on the returned one of session profiles 20. In other words, mobile gateway 20 may provide high availability for session contexts 38 on a per-subscriber basis based on whether the corresponding one of subscriber profiles 20 authorizes high availability as a service. Session control module 36 may then, when configuring session contexts 38, also indicate to high availability module 56 ("HA module 56") that the corresponding one of session contexts 38 are to be synchronized with a specified one of service units 27 different than service unit 27A. HA module 56 may then monitor those of session contexts 38 for which high availability has been configured, synchronizing any changes to those session contexts 38 to the corresponding designated one of service units 27.

There may be varying degrees of high availability that ensure against different failures. These varying degrees may differ in terms of subscription cost. For example, the above high availability provided by HA module 56 to synchronize session contexts 38 between service units 27 may present a relatively low assurance of high availability in comparison to high availability that synchronizes between two distinctly different gateways, such as that shown in the example of FIG. 1. As a result, the service provider may provide or offer different tiers of high availability. A first lower tier may provide high availability between different units 27 within the same gateway, i.e., gateway 8 in the example of FIG. 2. Higher tiers of high availability may involve synchronizing this data between different chassis or even different devices.

In some instances, session control module 36 may determine that only some non-zero subset of session contexts 38 associated with the same subscriber (and not all of the ones of session contexts 38 associated with the same subscriber) be synchronized to the backup one of service units 27. To illustrate, the one of subscriber profiles 20 associated with the subscriber may indicate that only those of session contexts 38 identified by an APN indicated in the one of subscriber profiles 20 be synchronized to the backup one of service units 27. That is, as described above, the APN specified in the corresponding one of service profiles 20 may identify one or more services, where such APN may be used to indicate that sessions established in support of delivery of those services may be identified for synchronization according to the techniques described in this disclosure. Session control module 36, when establishing one of session contexts 38 in response to message 50, may identify the APN for which the session is to be created. If this APN specified in message 50 (or inferred from other information in message 50) matches the APN specified in the retrieved one of subscriber profiles 20, session control module 36 may interface with HA module 56 to indicate that this newly created one of session contexts 38 is to be provided with high availability, i.e., meaning that this one of session contexts 38 is to be synchronized with the backup one of service units 27 in this example. HA module 56 may then synchronize this one of session contexts 38 in response to any changes, updates or deletions of data to this one of session contexts 38.

In this sense, one or more of subscriber profiles 20 may specify that the high availability service is to be provided with respect to the portion of network traffic associated with one or more services identified by an access point name (APN). The techniques may then enable session control module 36 to determine whether to provide the high availability service by at least in part determining to provide the high availability service with respect to the portion of the network traffic associated with the one or more services identified by the APN of the one or more subscriber profiles 20. Session control module 36 may interface with HA module 56 such that HA module 56, when providing the high availability service, provide the high availability service for the portion of the network traffic associated with the one or more services identified by the APN.

In some instances, another gateway, such as an SSGN or an MME, may perform the APN-based aspect of the techniques to home a session with a mobile gateway that provides high availability. That is, the SSGN and/or MME may select a mobile gateway, such as mobile gateway 8, that provides high availability based on the APN and the subscriber profile. In this way, another device, such as an SSGN and/or MME, may determine whether the mobile gateway provides high availability for the session. The techniques should not therefore be limited in this way to the example shown in FIG. 1.

As another example, session control module 36 may determine, based on the retrieved one of subscriber profiles 20, that high availability is to be provided only during a certain time or period of day, such as during business hours. Session control module 36 may then interface with HA module 56 to specify that the one of session contexts 38 is to be provided with high availability during the indicated period of the day. HA module 56 may then only synchronize this one of session contexts 38 during the indicated time or period of day.

In this example, one or more subscriber profiles 20 specifies that the high availability service is to be provided with respect to at least the portion of network traffic during defined periods of time. As a result, session control module 36 may, when determining whether to provide the high availability service, determine to provide the high availability service with respect to at least the portion of the network traffic during the defined periods of time. Session control module 36 may interface with HA module 56 such that HA module 56 may, when providing the high availability service, provide the high availability service for at least the portion of the network traffic during the defined periods of time.

As yet another example, session control module 36 may determine, based on the retrieved one of subscriber profiles 20, that high availability is to be provided only for a set or configurable duration, such as for the first five minutes of the session. Session control module 36 may then interface with HA module 56 to specify that the one of session contexts 38 is to be provided with high availability during the set or configurable duration. HA module 56 may then only synchronize this one of session contexts 38 during this duration.

In this sense, one or more of subscriber profiles 20 specifies that, for a duration, the high availability service is to be provided with respect to at least the portion of the corresponding network traffic. Session control module 36 may then, when determining whether to provide the high availability service, determine an amount of time for which the high available service has been provided with respect to at least the portion of the network traffic, and determine to provide the high availability service when the amount of time is less than the duration specified in the subscriber profile. Session control module 36 may interface with HA module 56 such that HA module 56 may, when providing the high availability service in this example, provide the high availability service for at least the portion of the network traffic based on the determination that the amount of time is less than the duration specified in the subscriber profile.

As yet another example, session control module 36 may determine, based on the retrieved one of subscriber profiles 20, parameters indicative of past session usage or subscriber behavior. Session control module 36 may then perform a heuristic analysis of these parameters to derive or otherwise determine high availability criteria for performing high availability with respect to the one of session contexts 38. Session control module 36 may then interface with HA module 56 to specify that the one of session contexts 38 is to be provided with high availability according to the high availability criteria. HA module 56 may then only synchronize this one of session contexts 38 according to this high availability criteria.

In other words, one or more of subscriber profiles 20 may specify parameters relating to the network traffic originated by the subscriber. Session control module 36 may then, when determining whether to provide the high availability service, perform a heuristic analysis of the parameters to determine whether to provide the high availability service with respect to at least the portion of the network traffic. Session control module 36 may interface with HA module 56 such that HA module 56, when providing the high availability service, provides the high availability service for at least the portion of the network traffic based on the heuristic analysis of the parameters.

While described above as being performed independently of each other in terms of different examples, various aspects of the techniques may be performed in conjunction with one another. That is, the time of day based aspects of the techniques may be performed in addition to heuristic analysis, duration based, and/or subset of session based (e.g., APN based) aspects of the techniques described in this disclosure. The various techniques should therefore not be limited to single application with any given network device but may be configured or otherwise defined to be performed in various combinations.

Figure 3:
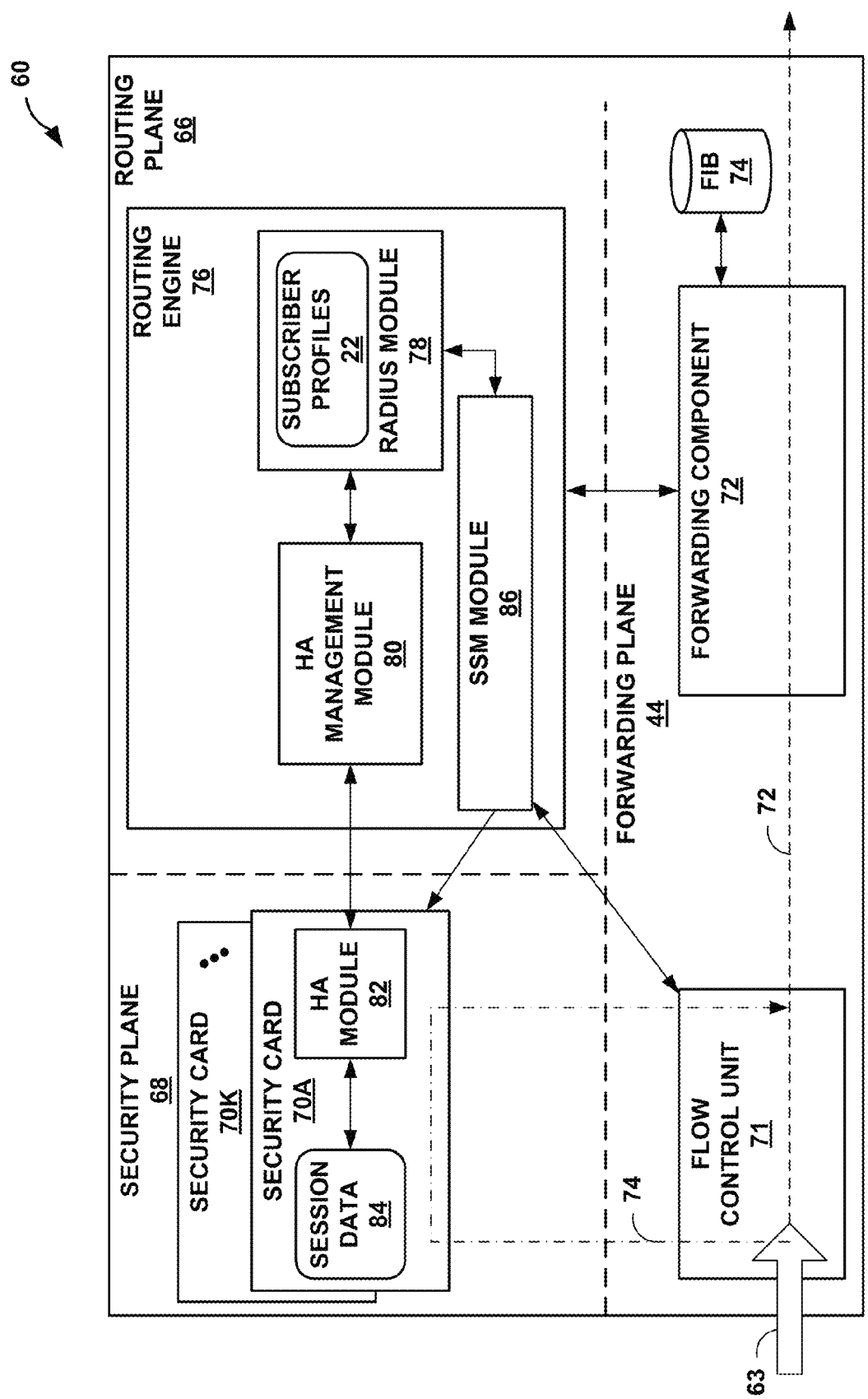
FIG. 3 is a block diagram illustrating an example of a firewall/IDP device that may implement the high availability techniques described in this disclosure.

FIG. 3 is a block diagram illustrating an example of a firewall/IDP device 60 that may implement the high availability techniques described in this disclosure. Firewall/IDP device 60 may represent on example of firewall/IDP device 9 shown in the example of FIG. 1. Although described as being performed by a firewall/IDP device 60 that is integrated with a router (and, for this reason, firewall/IDP device 60 may be referred to as a "router 60" in this disclosure), the various techniques described in this disclosure may be performed by a firewall/IDP device 60 that is separate from or external to any other form of network device.

Firewall/IDP device 60 includes a forwarding plane 64, a routing plane 66 and a security plane 68. While both of forwarding plane 64 and routing plane 66 are shown in more detail in FIG. 3, forwarding plane 64 and routing plane 66 may be substantially similar to forwarding plane 24 and routing plane 23, as described with respect to FIG. 2. Service plane 68 may implement the functionality of a network security device, such as firewall/IDP device 9 of the example of FIG. 1, as one or more of security cards 70A-70K ("security cards 70"). Router 60 may therefore couple to security cards 70 via an internal coupling or connection. In this sense, router 60 may internally couple to security cards 70.

Forwarding plane 64 may include a flow control unit 71 and a forwarding component 72. Flow control unit 71 may represent a module that determines to which flow each packet or data unit of network traffic 63 belongs. Forwarding component 72 may represent a component, such as one or more interface cards (not shown in FIG. 3), that forwards network traffic 63. Forwarding component 72 may represent a central or distributed forwarding engine, where a distributed forwarding engine is distributed across a plurality of interface cards and a central forwarding engine resides in a central location or control unit of edge router 60. Forwarding component 72 may forward network traffic 63 in accordance with a forwarding information base 74 ("FIB 74"). FIB 74 may comprise an association or table of mappings identifying an interface by which to forward a particular packet or data unit of traffic 63. U.S. Pat. No. 7,184,437 provides details on an exemplary embodiment of a router that utilizes a radix tree for route resolution, the contents of which is incorporated herein by reference in its entirety. Moreover, forwarding plane 64 may be provided by dedicated forwarding integrated circuits normally associated with high-end routing and forwarding components of a network router. Again, U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router, as incorporated by reference above.

Routing plane 66 may include a routing engine 76 that resolves routes through the network in accordance with one or more of a plurality of routing protocols, installing the resolved routes to FIB 74 as next hops. Routing engine 76 may also include a RADIUS module 78 which may be similar to RADIUS module 54 of FIG. 2. RADIUS module 78 may implement policy charging and rules function (PCRF) by which to enable various services. Routing engine 76 may also include a high availability management module 80 that represents a module for interfacing with HA modules 82 (which may be similar to HA modules 56 of FIG. 2) so as to configure HA modules 82 to perform high availability as a service on the more granular basis described in detail above with respect to HA modules 56. However, rather than operate on session contexts 38, HA modules 56 may operate with respect to session data 84.

Session data 84 represents any data maintained on a per session basis that is used in performing firewall, IDP or other security services. Often, when performing higher layer (in terms of the Open Systems Interconnection or OSI model) IDP or other security services, security cards 70 generate session data 84, reflective of the interchange of packets, layer three (L3) protocols (such as IP), layer four (L4) protocols (such as the transmission control protocol or TCP), or even layers above L4, such as layer seven (L7) protocols, including a hypertext transfer protocol (HTTP), a session initiation protocol (SIP), a real-time protocol (RTP) or any other type of protocol. Security cards 70 may each maintain or otherwise generate session data 84 to identify improper or malformed packets that may represent an attempt at a malicious attack, both in terms of viruses, Trojans or other hacks and protocol anomalies that may result in opening for malicious attacks to occur.

As further shown in the example of FIG. 3, routing engine 76 may also include a subscriber service management (SSM) module 86 ("SSM module 86"). SSM module 86 may represent a module responsible for activating application of security services to network traffic 63 on a per-subscriber basis. SSM module 86 may present an interface by which a user, such as an administrator, or device, such as a provisioning system, may interface with routing engine 76 to enable application of security services to received network traffic 63. SSM module 86 may interface with flow control unit 71 to specify whether or not sessions and/or flows associated with a specific subscriber should be redirected to security plane 68 prior to being forwarded via forwarding component 72.

In some instances, SSM module 86 may interface with RADIUS module 78 to retrieve subscriber profiles 22, which may include information as to whether security services are to be performed with respect to portions of network traffic 63 originated by devices operated by the corresponding subscribers. SSM module 86 may then update flow control unit 71 in the manner described above to enable or disable security services for those flows and/or sessions associated with devices operated by the subscriber (where such association is usually by way of an IP address or IP address prefix associated with the subscriber).

Security plane 68, as described above, may include one or more security cards, such as security cards 70. Security cards 70 may each represent a card inserted into a multi-chassis router, where router 60 may include a multi-chassis router. Although not shown in the example of FIG. 3, security cards 50 may each include a service module that applies one or more security services to network traffic 63. This service module may generate or otherwise maintain session data 84.

Initially, upon powering up, activating, starting or otherwise enabling router 60, SSM module 86 may receive network traffic 63. For each packet of network traffic 63, flow control unit 71 may access the flow table (which is not shown in FIG. 3 for ease of illustration purposes) using a five-tuple (which may refer to a source address, a source port, a destination address, a destination port and protocol) extracted from the header of each packet (where this header is often a L3 header). The five-tuple may effectively identify a flow. If this flow is not stored to the flow table, flow control unit 71 may interface with SSM module 86 to determine whether the packet should be dropped, forwarded or redirected to security cards 70. That is, flow control unit 71 may request SSM module 86 to direct flow control unit 71 in what operations should be performed with respect to the packet. Flow control unit 71 may provide the five-tuple in the request to SSM module 86.

SSM module 86 may, in response to this request, interface with RADIUS module 78, requesting that RADIUS module 78 provide either authorization that this subscriber has purchased security services or one of subscriber profiles 22 associated with either the source or destination address. SSM module 86 may then, based either on the authorization or the one of subscriber profiles 22, interface with flow control unit 71 to add the five-tuple to the flow table. Assuming the five-tuple is added to the flow table, flow control unit 71 may forward the packet to one of security cards 70 (often by hashing the five-tuple to select one of security cards 70 and updating the flow table to indicate that the five-tuple of the packet is to be handled by the selected one of security cards 70). The selected one of security cards 70 may then apply one or more security services to the packet (where the one or more security services may, in some instances, also be indicated by SSM module 82 to the selected one of security cards 70).

When performing this authorization to apply security services with respect to the flow identified by the five-tuple, SSM module 86 may effectively perform what is commonly characterized as the "slow path" in which application of the security services is authorized and configured within service plane 68. Once application of security services is configured or otherwise provisioned for a flow, flow control unit 71 may access the flow table and determine whether or not to redirect the flow to service plane 68 without interfacing with SSM module 86. This subsequent path that the path takes, whereby the flow control unit 71 determines that the flow is associated with an entry in the flow table, may be referred to as the "fast path" in that this path is faster than the slow path given that authorization is not required before redirecting the packet.

When performing this slow path, SSM module 86 may, as described above, initiate authorization of the application of security services to the flow. When authorizing the application of security services the flow, RADIUS module 78 may also determine whether the corresponding one of subscriber profiles 22 specifies that flows and/or sessions associated with subscriber devices operated by the subscriber are to receive high availability service. Upon determining that high availability service is to be provided, RADIUS module 78 may interface with HA management module 80 to initiate the high availability service for the corresponding flow and/or session identified by the five-tuple. HA management module 80 may then interface with HA module 82, specifying session data 84 maintained for the indicated five-tuple is to be synchronized with another one of security cards 70, such as security card 70K. HA module 82 may then begin synchronizing any session data 84 with the indicated one of security cards 70, thereby providing high availability in case of the failure of security card 70A.

In some instances, security card 70A may perform deep packet inspection with respect to the flow, identifying the flow as a type of network traffic or associated with a type of network traffic. Typically, security card 70A performs a form of L7 deep packet inspection to determine the type of network traffic to which the flow corresponds. That is, security card 70A may identify the flow as an HTTP flow, a video conferencing flow, a real-time streaming flow, a test messaging or instant chat flow, or other types of flows. HA management module 80 may, when configuring HA module 82 to provide high availability with respect to the flow, qualify that the flow is only to receive high availability when the flow is identified as corresponding to one or more approved types of network traffic. HA module 82 may then inspect session data 84 associated with the five-tuple that identifies the flow to determine the type of the network traffic to which the flow corresponds. HA module 82 may then compare this determined type of network traffic with the approved types of network traffic. When the determined type matches one of the approved types, HA module 82 may initiate high availability with respect to this flow, synchronizing this associated portion of session data 84 with another one of security cards 70. When no match exists, HA module 82 may not initiate high availability with respect to this flow.

In this sense, the one of subscriber profiles 22 specifies that the high availability service is to be provided with respect to one or more different types of the network traffic. Security card 70A may then, when determining whether to provide the high availability service, perform deep packet inspection with respect to the network traffic to determine whether at least the portion of the network traffic corresponds to the one or more different types of the network traffic specified in the one of subscriber profiles 22. HA module 82 may then determine to provide the high availability service with respect to the portion of the network traffic when the portion of the network traffic has been determined to correspond to the one or more different types of the network traffic. HA module 82 may then, when providing the high availability service, provide the high availability service for the portion of the network traffic determined to correspond to the one or more different types of the network traffic.

In this manner, the techniques may enable high availability as a service within network security devices or within network devices that incorporate network security devices, such as router 60. Although not described in detail, high availability may also be provided within router 60 in conjunction with one or more of the other forms of high availability described above. That is, deep packet inspection based aspect of the techniques may be performed in conjunction with the time of day based, heuristic analysis, duration based, and/or subset of session based (e.g., APN based) aspects of the techniques described in this disclosure. The various techniques should therefore not be limited to single application with any given network device but may be configured or otherwise defined to be performed in various combinations.

While processing packets is described above with respect to an internal network security device, e.g., security cards 70, the techniques apply to external network security devices in a similar manner. In external instances, such as depicted in FIG. 1, flow control unit 71 may, instead of forwarding service traffic internally to service card 70, forward traffic via forwarding component 72 to an external network security device, such as network security device 9. In most other respects, the techniques between the two various embodiments are similar and the techniques therefore should not be limited in any aspect to one or the other of the alternative embodiments.

Figure 4:
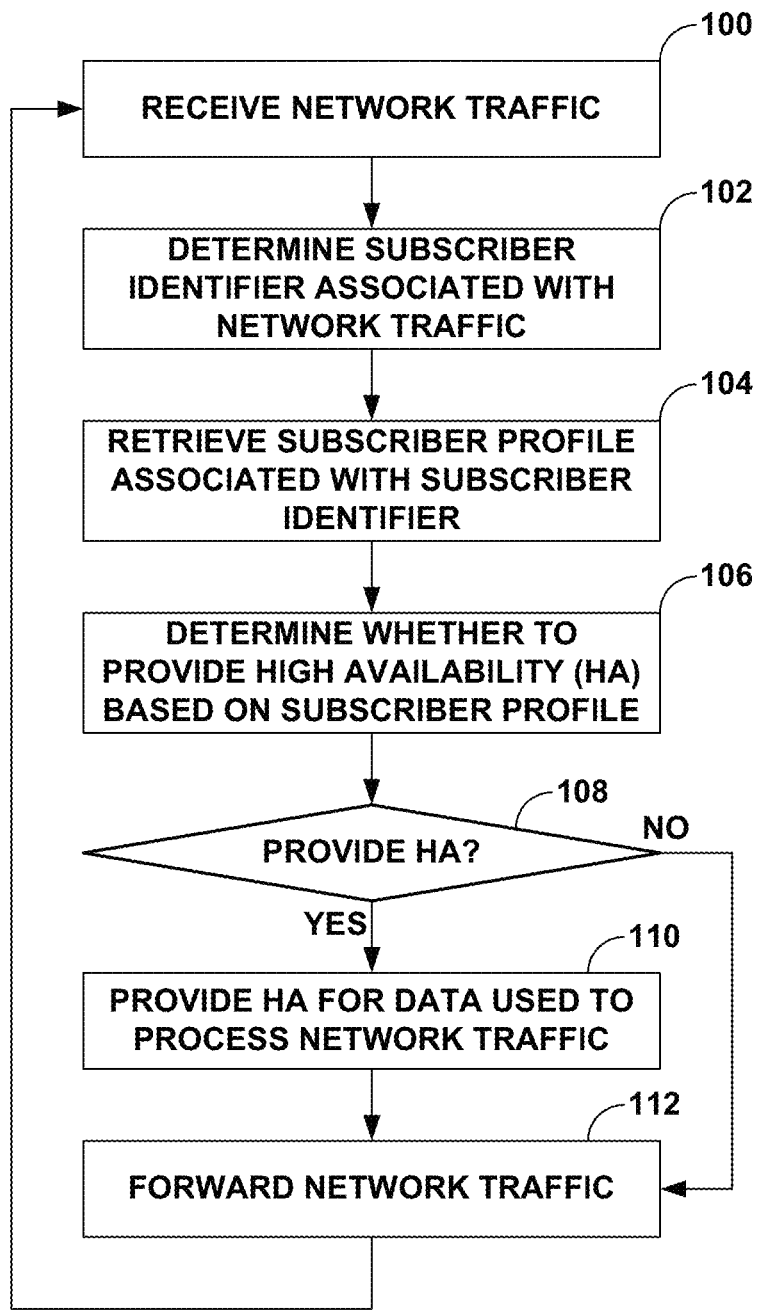
FIG. 4 is a flowchart illustrating exemplary operation of a network device in performing the high availability techniques described in this disclosure.

FIG. 4 is a flowchart illustrating exemplary operation of a network device, such as gateway 8 shown in the example of FIG. 2 or router 60 shown in the example of FIG. 3, in performing the high availability techniques described in this disclosure. While described below with respect to gateway 8, the techniques may performed by any form of network device, including firewall/IDP device 9 shown in the example of FIG. 1 and router 60 shown in the example of FIG. 3.

Mobile gateway 8 may receive network traffic originating from a subscriber device (100), such mobile device 6, operated by a subscriber (not shown in the example of FIG. 1). Mobile gateway 8 may then determine whether to provide a high availability service with respect to at least a portion of the network traffic based on the one of subscriber profiles 20 associated with the subscriber. That is, mobile gateway 8 may determine a subscriber identifier from the network traffic that identifies or that is associated with the subscriber (102). Mobile gateway 8 may then access subscriber profiles 20 based on the subscriber identifier to retrieve the one of subscriber profiles 20 associated with the subscriber, as described above (104). As noted above, in some instances, rather than store subscriber profiles 20 locally, mobile gateway 8 may access a remote authentication dial-in user service (RADIUS) server or some other form of authentication server to retrieve the one of subscriber profiles 20 that corresponds to the subscriber operating wireless device 6. In any event, mobile gateway 8 may determine, based on the subscriber profile, whether to provide the high availability service (106).

Mobile gateway 8 may then provide the high availability service for at least the portion of the network traffic based on the determination of whether to provide the high availability service (108). In the various ways described above, the one of subscriber profiles 20 may indicate that mobile gateway 8 is to provide high availability for at least a portion of the network traffic. When the one of subscriber profiles 20 indicates that high availability is to be provided ("YES" 108), session control module 36 of mobile gateway 8 interfaces with HA module 56 to configure HA module 56 to provide high availability for the session. HA module 56 may provide the high availability service for at least the portion of the network traffic by synchronizing data required to process at least the portion of the network traffic to mobile gateway 8' so that mobile gateway 8' is available to process at least the portion of the network traffic when mobile gateway 8 fails (110).

Although described below in more detail, mobile gateway 8 may synchronize subscriber information used to process network traffic (such as authentication and/or authorization information indicated that various sessions or flows originated by wireless device 6 are valid) to mobile gateway 8'. In some instances, mobile gateway 8 may only synchronize data for certain sessions or flows corresponding to certain services that are often identified by or associated with an access point name (which may be specified in the subscriber profile). Mobile gateway 8 may also perform this high availability service according to a time of day schedule, in which the high availability service is applied during certain periods of the day (e.g., during peak business hours). In some instances, mobile gateway 8 may only synchronize data and thereby provide the high availability service for a set or configurable duration of time (e.g., during the first five minutes of any session or flow). In some instances, mobile device 8 may monitor the subscriber device, such as wireless device 6, to determine parameters associated with wireless device 6, such as a type, length, and time of day of flows and/or sessions, where mobile device 8 may perform a heuristic analysis of these parameters to determine when to synchronize data and whether to synchronize data for all sessions and/or flows associated with the subscriber device or only some sessions and/or flows associated with the subscriber device.

When the one of subscriber profiles 20 indicates that high availability is not to be provided ("NO" 108) or after providing the high availability, mobile gateway 8 may forward the network traffic (112). This process may continue with respect to the current subscriber while also addressing sessions corresponding to different subscribers. Mobile gateway 8 may, in this sense, receive second network traffic originating from a second subscriber device operated by a second subscriber different than the first subscriber and determine whether to provide a high availability service with respect to at least a portion of the second network traffic based on a second subscriber profile associated with the second subscriber. Mobile gateway 8 may then provide high availability for at least the portion of the second network traffic based on the determination of whether to provide the high availability service with respect to at least the portion of the second network traffic.

In some instances, mobile gateway 8 may, when determining whether to provide the high availability service with respect to at least a portion of the first network traffic, determine that the high availability service is to be applied with respect to at least the portion of the first network traffic based on the first subscriber profile associated with the first subscriber. Moreover, mobile gateway 8 may, when determining whether to provide the high availability service with respect to at least a portion of the second network traffic, determine that the high availability service is not to be applied with respect to at least the portion of the second network traffic based on the second subscriber profile associated with the second subscriber. In this way, the techniques may facilitate more granular application of high availability such that high availability may be offered as an add-on service separate from the underlying Internet or other service.

In this way, the techniques may classify each subscriber based on a service level agreement (SLA), which may represent a reliability measurement, and home the session to redundant or non-redundant systems. With existing subscriber personal and usage data, the techniques may permit categorization of the subscribers as professional, machine to machine or students, to provide exemplary categories. As a result, the techniques may enable the operator to do a capacity planning to support, say 80% HA sessions and 20% non-HA sessions.

The techniques may mark the student and machine-to-machine sessions, such as the above noted electricity power-meter reading reporting sessions, as not requiring any redundancy support, since the session can be reestablished by again. This may provide the operator savings on capital outlays depending on the capacity planning.

In this way, the techniques may tag the user or subscriber profile data with an additional attribute to identify if the subscriber needs a high-reliable session or not. During the initial connection setup, the subscriber profile data may be used to decide whether to sync the subscriber information with the standby or not in accordance with the techniques described in this disclosure.

The following different forms of HA may enable/disable high availability based on various criteria, which may be very useful for the service providers and enterprise customers in mobile deployments. One example form of HA is subscriber based HA (which may involve marking the HA on/off on a per subscriber basis). Another example form of HA is APN based HA (where the services in that APN will be doing HA based on the APN properties). Another example form of HA is session/flow/DPI/machine to machine (M2M) based HA (which involves, after identifying the session/flow or application, HA being enabled or disabled via, as one example, PCRF rules). Another example form of HA is a time-of-day (TOD) based HA (where, after a specific TOD, HA may be turned off/on). Another example form of HA may include a long-lived session based HA (where HA can be turned off/on based on the longevity of the session/flow). Another example form of HA may include heuristics based HA (where HA can be turned off/on based on any heuristics on the different box/subscriber/session/flow parameters).

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various embodiments of the invention have been described. These and other embodiments are within the scope of the following claims.

The invention claimed is:

1. A method comprising:
   receiving, with a network device, network traffic originating from a subscriber device;
   determining, with the network device, whether to provide a high availability service with respect to at least a portion of the network traffic based on a subscriber profile associated with a subscriber that operates the subscriber device;
   providing, with the network device, the high availability service for at least the portion of the network traffic based on the determination;
   processing, with the network device, at least the portion of the network traffic with the network device; and
   forwarding, with the network device, at least the portion of the network traffic.

2. The method of claim 1, wherein providing the high availability service for at least the portion of the network traffic comprises synchronizing, with a primary control unit of the network device, data required to perform the processing of at least the portion of the network traffic to a backup control unit so that the backup control unit is available to process at least the portion of the network traffic upon failover of the primary control to the backup control unit.

3. The method of claim 2, wherein the network device includes the backup control unit.

4. The method of claim 2,
wherein the network device is a first network device, and
wherein a second network device different from the first network device includes the backup control unit.

5. The method of claim 1,
wherein the network traffic comprises first network traffic,
wherein the subscriber device comprises a first subscriber device,
wherein the subscriber profile comprises a first subscriber profile, and
wherein the method further comprises:
receiving second network traffic originating from a second subscriber device operated by a second subscriber different than the first subscriber;
determining whether to provide a high availability service with respect to at least a portion of the second network traffic based on a second subscriber profile associated with the second subscriber; and
providing the high availability for at least the portion of the second network traffic based on the determination of whether to provide the high availability service with respect to at least the portion of the second network traffic.

6. The method of claim 5,
wherein determining whether to provide the high availability service with respect to at least a portion of the first network traffic comprises determining that the high availability service is to be applied with respect to at least the portion of the first network traffic based on the first subscriber profile associated with the first subscriber, and
wherein determining whether to provide the high availability service with respect to at least a portion of the second network traffic comprises determining that the high availability service is not to be applied with respect to at least the portion of the second network traffic based on the second subscriber profile associated with the second subscriber.

7. The method of claim 1,
wherein the subscriber profile specifies that the high availability service is to be provided with respect to the portion of network traffic associated with one or more services identified by an access point name (APN), and
wherein determining whether to provide the high availability service comprises determining to provide the high availability service with respect to the portion of the network traffic associated with the one or more services identified by the APN of the subscriber profile, and
wherein providing the high availability service comprises providing the high availability service for the portion of the network traffic associated with the one or more services identified by the APN.

8. The method of claim 1,
wherein the subscriber profile specifies that the high availability service is to be provided with respect to one or more different types of the network traffic,
wherein determining whether to provide the high availability service comprises:
performing deep packet inspection with respect to the network traffic to determine whether at least the portion of the network traffic corresponds to the one or more different types of the network traffic specified in the subscriber profile;
determining to provide the high availability service with respect to the portion of the network traffic when the portion of the network traffic has been determined to correspond to the one or more different types of the network traffic, and
wherein providing the high availability service comprises providing the high availability service for the portion of the network traffic determined to correspond to the one or more different types of the network traffic.

9. The method of claim 1,
wherein the subscriber profile specifies that the high availability service is to be provided with respect to at least the portion of network traffic during defined periods of time; and
wherein determining whether to provide the high availability service comprises determining to provide the high availability service with respect to at least the portion of the network traffic during the defined periods of time, and
wherein providing the high availability service comprises providing the high availability service for at least the portion of the network traffic during the defined periods of time.

10. The method of claim 1,
wherein the subscriber profile specifies that, for a duration, the high availability service is to be provided with respect to at least the portion of the network traffic; and
wherein determining whether to provide the high availability service comprises:
determining an amount of time for which the high available service has been provided with respect to at least the portion of the network traffic; and
determining to provide the high availability service when the amount of time is less than the duration specified in the subscriber profile, and
wherein providing the high availability service comprises providing the high availability service for at least the portion of the network traffic based on the determination that the amount of time is less than the duration specified in the subscriber profile.

11. The method of claim 1,
wherein the subscriber profile specifies parameters relating to the network traffic originated by the subscriber; and
wherein determining whether to provide the high availability service comprises:
performing a heuristic analysis of the parameters to determine whether to provide the high availability service with respect to at least the portion of the network traffic; and
wherein providing the high availability service comprises providing the high availability service for at least the portion of the network traffic based on the heuristic analysis of the parameters.

12. The method of claim 1, wherein determining whether to provide the high availability service comprises:
determining a subscriber identifier from the network traffic that is associated with the subscriber;
accessing a plurality of subscriber profiles based on the subscriber identifier to retrieve the subscriber profile associated with the subscriber; and
determining, based on the subscriber profile, whether to provide the high availability service.

13. The method of claim 1, wherein determining whether to provide the high availability service comprises determining whether to provide the high availability service with respect to at least the portion of the network traffic based on the subscriber profile associated with a subscriber that operates the subscriber device and policy charging and rules function (PCRF) rules.

14. The method of claim 1, wherein the network device comprises a mobile gateway that facilitates access by a mobile device to a mobile network.

15. A network device comprising:
at least one interface configured to receive network traffic originating from a subscriber device operated by a subscriber;
a control unit configured to determine whether to provide a high availability service with respect to at least a portion of the network traffic based on a subscriber profile associated with the subscriber, provide the high availability service for at least the portion of the network traffic based on the determination of whether to provide the high availability service, processing at least the portion of the network traffic with the network device, and forwarding at least the portion of the network traffic.

16. The network device of claim 15,
wherein the control unit comprises a primary control unit, and
wherein the primary control unit is further configured to, when providing the high availability service for at least the portion of the network traffic, synchronize data required to process at least the portion of the network traffic to a backup control unit so that the backup control unit is available to process at least the portion of the network traffic upon failover of the primary control to the backup control unit.

17. The network device of claim 16, wherein the network device includes the backup control unit.

18. The network device of claim 16,
wherein the network device is a first network device, and
wherein a second network device different from the first network device includes the backup control unit.

19. The network device of claim 15,
wherein the network traffic comprises first network traffic,
wherein the subscriber device comprises a first subscriber device,
wherein the subscriber profile comprises a first subscriber profile, and
wherein the interface is further configured to receive second network traffic originating from a second subscriber device operated by a second subscriber different than the first subscriber, and
wherein the control unit is further configured to determine whether to provide a high availability service with respect to at least a portion of the second network traffic based on a second subscriber profile associated with the second subscriber, and provide the high availability service for at least the portion of the second network traffic based on the determination of whether to provide the high availability service with respect to at least the portion of the second network traffic.

20. The network device of claim 19,
wherein the control unit is further configured to, when determining whether to provide the high availability service with respect to at least the portion of the first network traffic, determine that the high availability service is to be applied with respect to at least the portion of the first network traffic based on the first subscriber profile associated with the first subscriber, and
wherein the control unit is further configured to, when determining whether to provide the high availability service with respect to at least the portion of the second network traffic, determine that the high availability service is not to be applied with respect to at least the portion of the second network traffic based on the second subscriber profile associated with the second subscriber.

21. The network device of claim 15,
wherein the subscriber profile specifies that the high availability service is to be provided with respect to the portion of network traffic associated with one or more services identified by an access point name (APN), and
wherein the control unit is further configured to, when determining whether to provide the high availability service, determine to provide the high availability service with respect to the portion of the network traffic associated with the one or more services identified by the APN of the subscriber profile and, when providing the high availability service, provide the high availability service for the portion of the network traffic associated with the one or more services identified by the APN.

22. The network device of claim 15,
wherein the subscriber profile specifies that the high availability service is to be provided with respect to one or more different types of the network traffic,
wherein the control unit is further configured to, when determining whether to provide the high availability service, perform deep packet inspection with respect to the network traffic to determine whether at least the portion of the network traffic corresponds to the one or more different types of the network traffic specified in the subscriber profile, determine to provide the high availability service with respect to the portion of the network traffic when the portion of the network traffic has been determined to correspond to the one or more different types of the network traffic, and
wherein the control unit is further configured to, when providing the high availability service, provide the high availability service for the portion of the network traffic determined to correspond to the one or more different types of the network traffic.

23. The network device of claim 15,
wherein the subscriber profile specifies that the high availability service is to be provided with respect to at least the portion of network traffic during defined periods of time; and
wherein the control unit is further configured to, when determining whether to provide the high availability service, determine to provide the high availability service with respect to at least the portion of the network traffic during the defined periods of time, and
wherein the control unit is further configured to, when providing the high availability service, provide the high availability service for at least the portion of the network traffic during the defined periods of time.

24. The network device of claim 15,
wherein the subscriber profile specifies that, for a duration, the high availability service is to be provided with respect to at least the portion of the network traffic; and
wherein the control unit is further configured to, when determining whether to provide the high availability service, determine an amount of time for which the high available service has been provided with respect to at least the portion of the network traffic, and determine to provide the high availability service when the amount of time is less than the duration specified in the subscriber profile, and
wherein the control unit is further configured to, when providing the high availability service, provide the high availability service for at least the portion of the network traffic based on the determination that the amount of time is less than the duration specified in the subscriber profile.

25. The network device of claim 15,
wherein the subscriber profile specifies parameters relating to the network traffic originated by the subscriber; and
wherein the control unit is further configured to, when determining whether to provide the high availability service, perform a heuristic analysis of the parameters to determine whether to provide the high availability service with respect to at least the portion of the network traffic, and
wherein the control unit is further configured to, when providing the high availability service, provide the high availability service for at least the portion of the network traffic based on the heuristic analysis of the parameters.

26. The network device of claim 15, wherein the control unit is further configured to, when determining whether to provide the high availability service, determine a subscriber identifier from the network traffic that is associated with the subscriber, access a plurality of subscriber profiles based on the subscriber identifier to retrieve the subscriber profile associated with the subscriber, and determine, based on the subscriber profile, whether to provide the high availability service.

27. The network device of claim 15, wherein the control unit is further configured to, when determining whether to provide the high availability service, determine whether to provide the high availability service with respect to at least the portion of the network traffic based on the subscriber profile associated with a subscriber that operates the subscriber device and policy charging and rules function (PCRF) rules.

28. The network device of claim 15, wherein the network device comprises a mobile gateway that facilitates access by a mobile device to a mobile network.

29. A non-transitory computer-readable storage medium having stored thereon instructions that, when executed, cause one or more processors of a network device to:
receive network traffic originating from a subscriber device operated by a subscriber;
determine whether to provide a high availability service with respect to at least a portion of the network traffic based on a subscriber profile associated with the subscriber;
provide the high availability service for at least the portion of the network traffic based on the determination of whether to provide the high availability service;
process at least the portion of the network traffic with the network device; and
forward at least the portion of the network traffic.

* * * * *